United States Patent
Shim (10) Patent No.: US 8,412,790 B2
(45) Date of Patent: Apr. 2, 2013

(54) METHOD, SYSTEM AND COMPUTER READABLE RECORDING MEDIUM FOR DETERMINING MAJOR GROUP UNDER SPLIT-BRAIN SYNDROME

(75) Inventor: Tak Kiel Shim, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 243 days.

(21) Appl. No.: 12/702,663

(22) Filed: Feb. 9, 2010

(65) Prior Publication Data

US 2010/0205273 A1   Aug. 12, 2010

(30) Foreign Application Priority Data

Feb. 12, 2009   (KR) .................. 10-2009-0011636

(51) Int. Cl.
   *G06F 15/16*   (2006.01)

(52) U.S. Cl. ....................................... 709/210

(58) Field of Classification Search ............ 709/220, 709/201, 219, 217, 218, 249, 238, 232, 224, 709/226, 203; 714/215, 735, 736, 740, 1–20; 370/230, 231, 232, 352, 389, 229, 254, 360, 370/338
   See application file for complete search history.

(56) References Cited

U.S. PATENT DOCUMENTS

| | | | |
|---|---|---|---|
| 6,363,495 B1 * | 3/2002 | MacKenzie et al. | 714/4.5 |
| 6,437,804 B1 * | 8/2002 | Ibe et al. | 715/736 |
| 7,739,677 B1 * | 6/2010 | Kekre et al. | 717/168 |
| 7,783,610 B2 * | 8/2010 | Lin et al. | 707/689 |
| 7,792,977 B1 * | 9/2010 | Brower et al. | 709/229 |
| 8,001,413 B2 * | 8/2011 | Wetmore et al. | 714/3 |
| 8,024,432 B1 * | 9/2011 | Sharma et al. | 709/220 |
| 2005/0204184 A1 * | 9/2005 | Endo | 714/4 |
| 2009/0228329 A1 * | 9/2009 | Asanuma | 705/10 |

* cited by examiner

*Primary Examiner* — Joseph Avellino
*Assistant Examiner* — Mark O Afolabi
(74) *Attorney, Agent, or Firm* — H.C. Park & Associates, PLC (57) ABSTRACT

The present invention relates to a method, system and computer readable recording medium for determining a major group in a network split-brain situation that occurs in a network-based distributed computing environment. According to an aspect of the present invention, there is provided a method of determining a major group among at least two groups created by splitting an initial group consisting of a plurality of nodes in a network-based distributed environment, the method comprising the steps of comparing the number of nodes included in a first group with the number of nodes included in a second group; acquiring history information of the nodes included in the first and second groups; and determining whether the first group or the second group is the major group using at least one of a result of comparing the number of nodes and the history information.

12 Claims, 5 Drawing Sheets

METHOD, SYSTEM AND COMPUTER READABLE RECORDING MEDIUM FOR DETERMINING MAJOR GROUP UNDER SPLIT-BRAIN SYNDROME

CROSS REFERENCE TO RELATED APPLICATION

This application claims priority from and the benefit of Korean Patent Application No. 10-2009-0011636, filed on Feb. 12, 2009, which is hereby incorporated by reference for all purposes as if fully set forth herein.

BACKGROUND OF THE INVENTION

1. Field of the Invention

Exemplary embodiments of the present invention relate to a method, system and computer readable recording medium for determining a major group in a network split-brain situation that occurs in a network-based distributed computing environment (or a distributed environment). More specifically, exemplary embodiments of the present invention relate to a method, system and computer readable recording medium for determining a major group in a network split-brain situation with reference to history information of nodes.

2. Discussion of the Background

A method of efficiently managing and controlling a variety of network-based distributed systems is needed in the current information technology (IT) environment. In a distributed environment, it is generally found that a plurality of computers are physically or logically connected to one another and a huge calculation problem can be solved using the processing capability of the plurality of computers connected as such. At this point, if there are tens of computers or processors participating in the distributed environment, the distributed environment can be properly maintained by an operator who manages the distributed environment. However, if the scale of the distributed environment includes thousands or tens of thousands of computers or processors, a management system, which is a solution for synchronizing and tuning the computers or processors on the whole, is essentially required.

One factor of such a management system is to guarantee fault tolerance, and particularly, to cope with an error situation where a network is abnormally split due to instability of links between respective nodes configuring a cluster.

Figure 1:
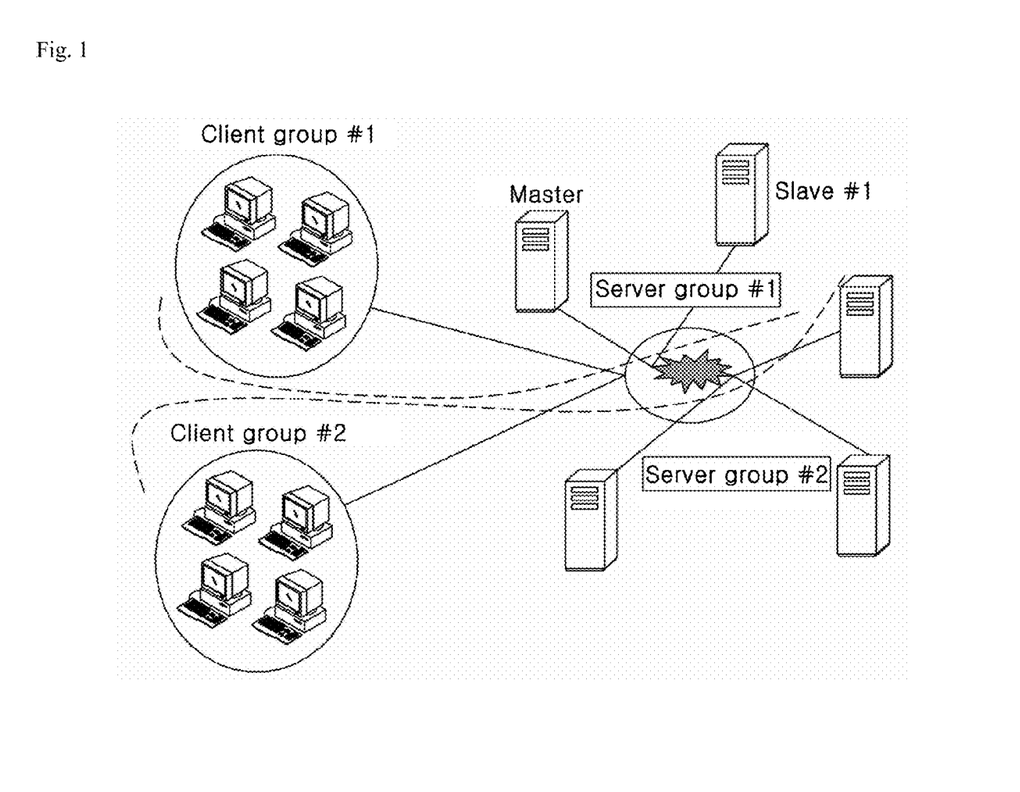
FIG. 1 is a view showing an example of a network split-brain situation.

FIG. 1 is a view showing an example of a network split-brain situation. In FIG. 1, it is assumed that a distributed environment management system includes a cluster consisting of five servers and each of the servers configuring the cluster maintains the same state information by replicating data in real-time.

If a network split-brain problem occurs in the state of FIG. 1 and a cluster is split into two server groups, servers in group #1 assume that all the servers in group #2 are down (i.e., fall in a state of incapability), and at the same time, the servers in group #2 assume that the servers in group #1 are down. Therefore, the two groups on the network determine themselves as a major group, and clients respectively connect to the two groups, which determine themselves as a major group, and perform a task. For example, client group #1 connected to group #1 performs read and write operations as usual, and client group #2 connected to group #2 also performs read and write operations.

However, in the aforementioned situation, when the network split-brain problem is restored and the two groups should be joined as a single group, it may not be possible to determine data belonging to which group is correct and data belonging to which group should be deleted. That is, there is a problem with service continuity and data integrity in the network split-brain situation.

SUMMARY OF THE INVENTION

Exemplary embodiments of the present invention provide a solution to the aforementioned problems.

Exemplary embodiments of the present invention also provide a solution for synchronizing and tuning a plurality of computers participating in a distributed computing environment on the whole.

Exemplary embodiments of the present invention also provide service continuity and data integrity in a situation where a network split-brain problem occurs.

Additional features of the invention will be set forth in the description which follows, and in part will be apparent from the description, or may be learned by practice of the invention.

An exemplary embodiment of the present invention discloses a method of determining a major group among at least two groups created by splitting an initial group consisting of a plurality of nodes in a network-based distributed environment. The method comprises comparing a number of nodes included in a first group with a number of nodes included in a second group; acquiring history information of the nodes included in the first group and the second group; and determining the first group or the second group as the major group using at least one of a result of comparing the number of nodes and the history information.

An exemplary embodiment of the present invention also discloses a computer readable recording medium for recording a computer program for executing the steps of a method of determining a major group among at least two groups created by splitting an initial group consisting of a plurality of nodes in a network-based distributed environment. When executed, the computer program performs the steps of: comparing a number of nodes included in a first group with a number of nodes included in a second group; acquiring history information of the nodes included in the first group and the second group; and determining the first group or the second group as the major group using at least one of a result of comparing the number of nodes and the history information.

An exemplary embodiment of the present invention also discloses a distributed environment management system including a plurality of nodes. The system includes history information of the plurality of nodes, wherein when an initial group is split into at least two groups, at least one of the plurality of nodes determines one of the at least two groups as a major group using at least one of the number of nodes included in each split group and the history information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

In the following detailed description of the present invention, references are made to the accompanying drawings that show, by way of illustration, specific embodiments in which the invention may be practiced. These embodiments are described in sufficient detail to enable those skilled in the art to practice the present invention. It is to be understood that the various embodiments of the invention, although different from each other, are not necessarily mutually exclusive. For example, specific configurations, structures, and features described herein, in connection with one embodiment, may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken for the purpose of limitation, and the scope of the present invention is defined only by the appended claims, appropriately interpreted, along with the full range of equivalents to which the claims are entitled. In the drawings, like reference numerals refer to the same or similar functionality throughout the several views.

Hereinafter, exemplary embodiments of the present invention will be described in detail with reference to the accompanying drawings so that those skilled in the art can easily practice the present invention.

[Exemplary Embodiments of the Present Invention]

Configuration of Entire System

Figure 2:
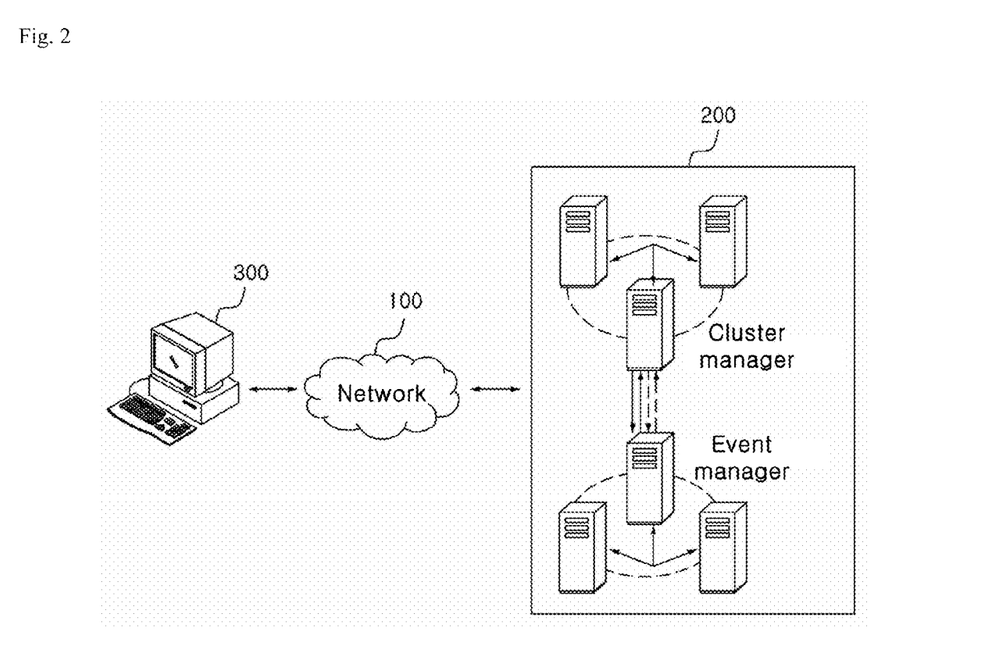
FIG. 2 is a view schematically showing a distributed environment according to an exemplary embodiment of the present invention.

FIG. 2 is a view schematically showing a distributed environment according to an exemplary embodiment of the present invention.

As shown in FIG. 2, the entire system according to an exemplary embodiment of the present invention comprises a communication network 100, a distributed environment management system 200 for providing a lock service in a distributed environment, and a plurality of clients 300 using the service provided by the distributed environment management system 200.

First, the communication network 100 can be configured without regard to a communication type such as a wired communication or a wireless communication and constructed as a variety of communication networks including a local area network (LAN), a metropolitan area network (MAN), a wide area network (WAN), and the like.

According to an exemplary embodiment of the present invention, the distributed environment management system 200 can consist of a plurality of servers (hereinafter, generally referred to as nodes) and provide the clients 300 with a lock service in order to guarantee data integrity between the plurality of clients 300 sharing various system resources.

In addition, the distributed environment management system 200 may create, maintain and release a session such that the client 300 may communicate with a specific node placed in the distributed environment management system 200 and provide a switching service such that the client 300 may communicate with another waiting node when an error occurs in the specific node communicating with the client 300.

Furthermore, the distributed environment management system 200 may serve to synchronize a plurality of nodes and process various types of events.

According to an exemplary embodiment of the present invention, the distributed environment management system 200 may comprise a cluster manager, an event manager, and (in some cases) a client library (not shown).

According to an exemplary embodiment of the present invention, the cluster manager may manage all the nodes in a cluster, which is a set of nodes in the distributed environment management system 200. More specifically, the cluster manager may manage the nodes in the cluster and process a lock operation while communicating with the client library. In addition, if the client 300 attempts a lock operation on a specific path or data, the cluster manager may confirm whether the client 300 requesting the lock operation has a right to perform a corresponding lock operation and immediately return whether or not a lock (i.e., non-blocking mode) is acquired as a value of True or False. In addition, the cluster manager may process the lock operation or an event accompanied with the lock operation. For example, the cluster manager may generate an event for informing the other clients 300 of locking a corresponding path or data depending on a type of locking and transfer the event to the event manager.

According to an exemplary embodiment of the present invention, the communication with the client library can be accomplished only through a master cluster manager, and the other slave cluster managers may maintain a replication of information on the state of the master cluster manager in real-time. If an error occurs in the master cluster manager, a new master cluster manager can be elected among the slave cluster managers.

Then, according to an exemplary embodiment of the present invention, the event manager consists of one master event manager and a plurality of slave event managers, like the cluster manager. The event manager manages a list of clients 300 from which events are notified and transfers notification of the event to a corresponding client 300. More specifically, the event manager may perform largely two types of events such as a lock event and a generic event. The steps of processing the events will be described in more detail. First, in the case of the lock event, the master cluster manager transfers information on the lock event to the master event manager, and the event manager transmits the event to a plurality of registered clients 300 in a multicast manner. Next, in the case of the generic event, regardless of lock operation, the client 300 may request the event manager to generate an event or register the event in a general publish-subscribe manner and receive events from the event manager.

In addition, according to an exemplary embodiment of the present invention, the client library is a program provided in the form of a library so that the client 300 may easily use the lock and event services of the distributed environment management system 200, and at least a part of the library can be included in the distributed environment management system 200. It is apparent that at least a part of the client library is included in the client 300 in many cases, if necessary.

According to an exemplary embodiment of the present invention, the client 300 communicates with the distributed environment management system 200 using a function provided by the client library. More specifically, the client library is a set of libraries that can be provided to the client 300 such that the client may remotely use a service provided by the distributed environment management system 200. According to an exemplary embodiment of the present invention, a user may insert and use the library in his or her program like a plug-in. In an initialization process, the user may create a proxy object to connect to a cluster and perform a lock operation in the form of a remote procedure call (RPC). The client library abstracts a variety of situations, such as master node election, fail-over, member change, and the like, which occur in a remote cluster, thereby helping the user to use secure and abstract remote services in the same manner as merely using a local service.

Providing Lock Service

In a distributed environment, a plurality of processes or threads cooperatively perform one task in many cases. Since an incorrect result can be obtained if a plurality of transactions included in the processes or threads simultaneously performs a read or write operation on a data, data commonly accessible to the plurality of transactions needs to be protected. In the same manner, this can be applied to a case where computers included in the distributed environment share data with one another. Accordingly, a locking function may also be needed in the distributed environment such that a data used by a transaction cannot be accessible to other transactions.

Accordingly, hereinafter, according to an exemplary embodiment of the present invention, the lock service, with which the distributed environment management system 200 provides the client 300, will be described in detail.

Figure 3:
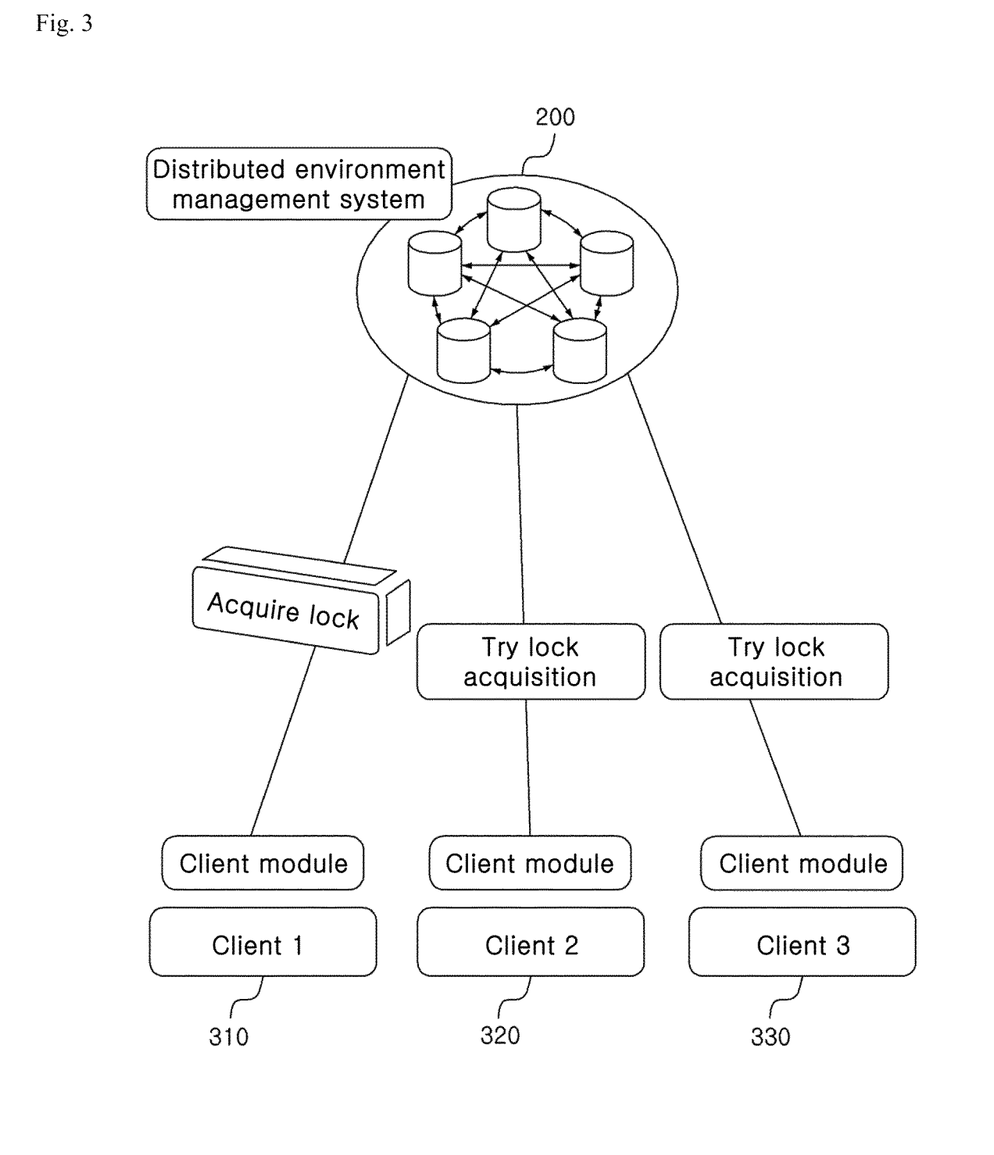
FIG. 3 is a view showing an example of a locking function provided by a distributed environment management system 200 according to an exemplary embodiment of the present invention.

FIG. 3 is a view showing an example of a locking function provided by the distributed environment management system 200. In the meantime, it is assumed that three clients 300 simultaneously use one service in FIG. 3.

Referring to FIG. 3, it is understood that when client 1 310, client 2 320 and client 3 330 desire to perform a read or write operation on shared data, they can request locking corresponding data from the master cluster manager of the distributed environment management system 200 according to an exemplary embodiment of the present invention. If client 2 320 and client 3 330 do not request to lock the corresponding data when client 1 310 of FIG. 3 requests locking the data, client 1 310 may obtain the lock without any special problem. However, as shown in FIG. 3, if at least two clients competitively request locking the data, only one of the clients can be given the lock.

As one method for coping with the case where the respective clients 310, 320 and 330 competitively request locking the data, it can be assumed that each of the clients 310, 320 and 330 continuously requests the distributed environment management system 200 to lock the data until the lock is obtained, which can be implemented using a program code shown below.

```
/** Wait in a while loop until lock is obtained **/
while(!pleiades.getLock(service_A.LockMode.LOCK_EXCLUSIVE)) {
  try {
    /** Wait for one second if lock is not obtained **/
    Thread.sleep(1000);
  } catch(InterruptedExeption ie) {
    return;
  }
}
```

If a specific client 300 is given the lock, the master cluster manager may record lock information of the corresponding client 300 in a storage device such as a database, memory, or the like.

In addition, as described above, since the lock information updated by the master cluster manager is periodically or non-periodically replicated into the slave cluster managers, it is possible to maintain integrity between the information recorded in the master cluster manager and the information recorded in the slave cluster managers.

According to an exemplary embodiment of the present invention, the lock obtained from the distributed environment management system 200 may be allowed to be used only by the process or thread that has requested the corresponding lock. In addition, according to another exemplary embodiment of the present invention, the lock obtained from the distributed environment management system 200 may also be allowed to be used by all of the processes or threads included in the client 300 that has obtained the corresponding lock.

Election of a Master Node in Network Split-Brain Situation

As described above, guarantee of fault tolerance is an essential condition for distributed computing. According to an exemplary embodiment of the present invention, since lock information of the client 300 participating in the distributed environment and a process of notifying events to the client 300 are managed by the cluster manager and the event manager included in the distributed environment management system 200, if an error occurs in the cluster manager or the event manager, there may be a problem in that all the clients 300 participating in the distributed environment cannot normally perform a task.

Therefore, the distributed environment management system 200 includes a plurality of cluster managers, and one of them is set as a master cluster manager and directly communicates with clients. The other slave cluster managers replicate and store lock information of the master cluster manager, and thus, although an error occurs in the master cluster manager, service continuity and data integrity can be guaranteed using one of the slave cluster managers. The configuration described above can be applied to the event manager in the same manner (hereinafter, the term of "master node" will be used as a meaning for including the master cluster manager and the master event manager).

However, a network split-brain problem cannot be properly coped with only by the configuration described above. As previously described, this is because each of the groups split in a network split-brain situation determines all the nodes in the other groups are down and a master node is created in each group, and accordingly, after the error is recovered later, there may be a problem of data integrity between the nodes included in each of the groups.

Therefore, hereinafter, according to an exemplary embodiment of the present invention, a method of selecting a master node in a network split-brain situation will be described in more detail.

1. Quorum-Based Master Node Election

According to an exemplary embodiment of the present invention, the distributed environment management system 200 elects a master node by applying a quorum algorithm when a network split-brain problem occurs. Hereinafter, this will be described in further detail with reference to FIG. 4.

Figure 4:
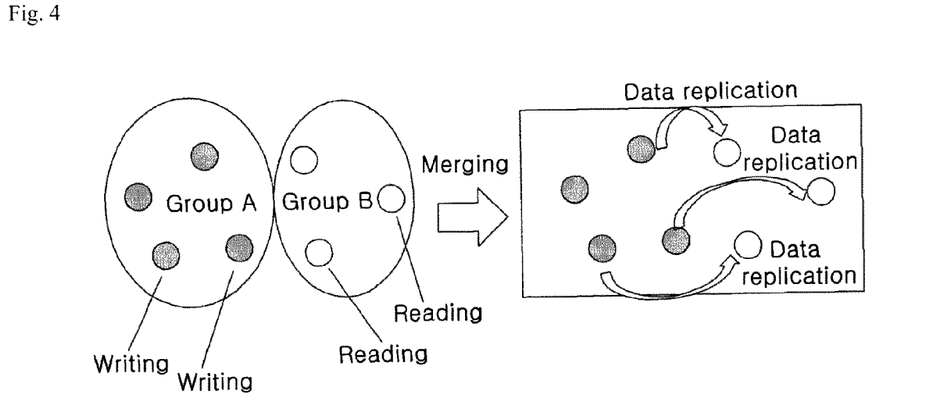
FIG. 4 shows a view of a quorum algorithm applied to a network split-brain situation according to an exemplary embodiment of the present invention.

FIG. 4 shows a quorum algorithm applied to a network split-brain situation.

Referring to FIG. 4, a network split-brain problem occurs, for example, in a cluster consisting of seven nodes in total and the cluster is split into group A including four nodes and group B including three nodes.

In the situation described here, since group A secures more than half of the total nodes (i.e., seven nodes), the quorum is satisfied, and thus, group A can be classified as a major group. Accordingly, one of the nodes included in the major group is determined as a master node, and communication with the client 300 can be performed through the master node. In addition, the master node can be allowed to perform a read or write operation.

On the other hand, since group B secures less than half of the nodes, it is classified as a minor group. A master node will not be elected from such a minor group.

In order for each group to determine whether the group itself is a major group or a minor group in a network split-brain situation, information on how many nodes are in an initial group before a network split-brain problem occurs should be stored in at least one node of each group created after the network split-brain problem occurs. According to an exemplary embodiment of the present invention, since information stored in the master node is replicated into a corresponding slave node, such a requirement will be accomplished by storing the information on how many nodes are in an initial group in the master node.

Next, if it is assumed that a network split-brain problem occurs once again while a network split-brain problem has already occurred as shown in FIG. 4, so that group A is split into group A1 including three nodes and group A2 including one node and group B is split into group B1 including two nodes and group B2 including one node, since any one of the groups does not contain four or more nodes corresponding to more than half of the nodes included in the initial group, there is a problem in that none of the groups can satisfy the quorum.

In order to solve such a problem, according to an exemplary embodiment of the present invention, the quorum can be dynamically re-set as the number of nodes configuring a group is changed. More specifically, a re-set time of a group should be set first in order to implement a dynamic quorum. According to an exemplary embodiment of the present invention, the re-set time of a group can be set to 30 seconds. In this case, if the number of nodes in the group does not change for 30 seconds, the group is re-set from this time point. As the group is re-set, the number of nodes in the group, which is a reference for calculating the quorum, is initialized, and thus, the quorum can be changed.

In the example described above, since the number of nodes included in the group is seven in total before an initial network split-brain problem occurs, the quorum is set to four. Thereafter, if a first network split-brain problem occurs, the quorum of group A is re-set to three since group A includes four nodes, and the quorum of group B is re-set to two since group B includes three nodes. Accordingly, although a second network split-brain problem occurs, group A1 and group B1 can satisfy the quorums.

However, since group B1 is classified as a minor group when the first network split-brain problem occurs, group B1 cannot be classified as a major group although the second network split-brain problem occurs and it secures more than half of the nodes, and only group A1 can be classified as a major group. Accordingly, the master node may store information on whether a corresponding group is a major group or a minor group before a network split-brain problem occurs, together with information on how many nodes are included in a group existing before the network split-brain problem occurs.

Next, a process after the network split-brain problem has been restored will be described with reference to FIG. 4. The nodes included in group B that was a minor group fetch the latest state information from a node included in group A that is a major group and update the state information. Accordingly, the seven nodes can function as one group again.

In the manner described above, data integrity can be guaranteed even in a network split-brain situation.

However, if only the quorum algorithm is employed as described above, there is a disadvantage in that service continuity or data integrity cannot be guaranteed in some cases. For example, when a group consisting of six nodes in total is split into two groups each including three nodes, services cannot be maintained since neither of the groups includes more than half of the total nodes. In addition, when groups each including one node are created due to continuous network split-brain problems, services also cannot be maintained in the same manner as described above. That is, when the quorum is applied in a static manner, particularly, in terms of service continuity, there are restrictions as follows:

the number of total nodes in an initial group: 2N+1
the minimum number of quorum: N+1
the minimum number of nodes that can perform a write operation=the number of quorum=N+1 (where N is a natural number)

2. History-Based Master Node Election

According to an exemplary embodiment of the present invention, the distributed environment management system 200 may further enhance service continuity while guaranteeing data integrity using a history table.

According to an exemplary embodiment of the present invention, the history table may include node ID information at a time point of initially configuring a group, information on a time point of joining the group, information on a node state, and information on a group state. The following table shows examples of the data included in the history table.

| ID | Joining time | Node state | Group state |
|---|---|---|---|
| Node #1 | 2008/07/23__12:12:33 | Master | Major |
| Node #2 | ***__12:12:35 | Slave | Minor |
| Node #3 | ***__12:12:38 | Slave | Minor |
| ... | ... | ... | ... |
| ... | ... | ... | ... |

The history table shown above can be created when a group is initially configured and can be maintained until the function of the group is ended. The node state information, which is the third field of the history table, is changed into master or slave whenever a new master node is elected, and the group state information is changed to major or minor as a network split-brain problem occurs.

When a group is split into two groups having the same number of nodes due to a network split-brain problem, the distributed environment management system 200 according to an exemplary embodiment of the present invention may determine a major group using the history table. The history table can also be used when a major group is determined among two groups where the difference in the number of nodes of each group is less than or equal to a certain reference value, as well as when a major group is determined among two groups having exactly the same number of nodes. More specifically, a group including a node that belonged to a major group before a network split-brain problem occurred and has the earliest time point of joining the group can be determined as a new major group. In addition, according to an exemplary embodiment of the present invention, a node having the earliest time point of joining the group can also be determined as a master node of a corresponding group. As a result, if there is not a unique group satisfying the quorum, a group of which the state is major immediately before a network split-brain problem occurs and which has a node elected as a master most recently (i.e., a node having the earliest time point of joining the group) can be determined as a new major group.

Figure 5:
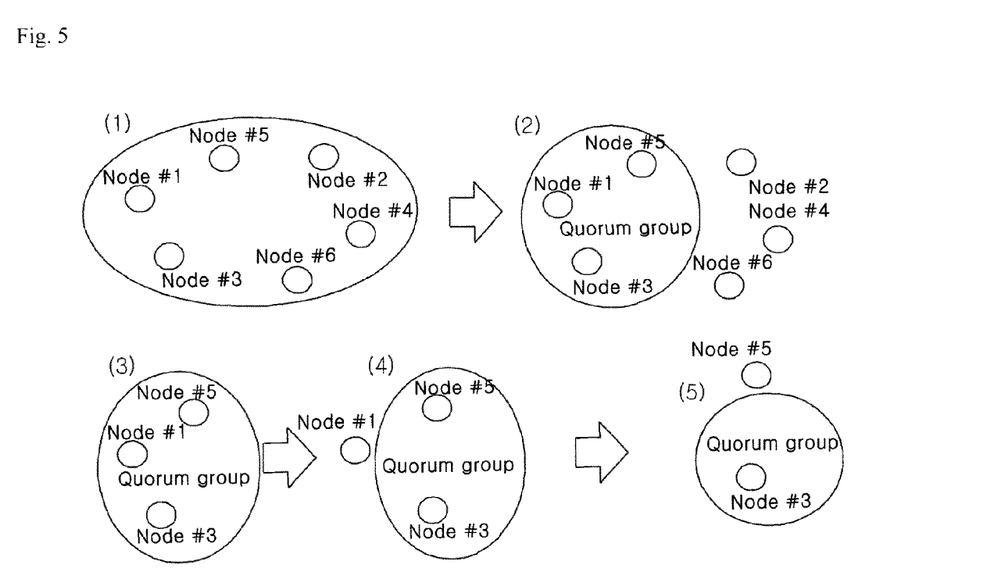
FIG. 5 is a view showing an example of resolving a network split-brain problem by applying a dynamic quorum method based on a history table according to an exemplary embodiment of the present invention.

FIG. 5 is a view showing an example of resolving a network split-brain problem by applying a dynamic quorum method based on a history table. Hereinafter, a dynamic quorum method based on a history table will be described in further detail by describing a procedure of updating the history table, according to the steps shown in FIG. 5.

Step (1): a group consisting of six nodes before a network split-brain problem occurs, wherein all of the nodes belong to a major group. Since the time point of node #1 for joining the group is earliest, node #1 is elected as a master node.

| ID | Joining time | Node state | Group state |
|---|---|---|---|
| Node #1 | ***_12:12:33 | Master | Major |
| Node #2 | ***_12:12:35 | Slave | Major |
| Node #3 | ***_12:12:38 | Slave | Major |
| Node #4 | ***_12:12:39 | Slave | Major |
| Node #5 | ***_12:12:40 | Slave | Major |
| Node #6 | ***_12:12:42 | Slave | Major |

Step (2): a network split-brain problem occurs, and the group is then split into two groups having the same number of nodes each. Since a node having the earliest time point of joining the group is node #1 among the nodes belonging to the major group before the network split-brain problem occurs, the left side group is elected as a major group, and the right side group is changed to a minor group.

| ID | Joining time | Node state | Group state |
|---|---|---|---|
| Node #1 | ***_12:12:33 | Master | Major |
| Node #2 | ***_12:12:35 | Slave | Minor |
| Node #3 | ***_12:12:38 | Slave | Major |
| Node #4 | ***_12:12:39 | Slave | Minor |
| Node #5 | ***_12:12:40 | Slave | Major |
| Node #6 | ***_12:12:42 | Slave | Minor |

Steps (3) and (4): the major group is re-set to a group including node #1, node #3, and node #5 while passing through step (2) (accordingly, the quorum is re-set to two). Thereafter, a network split-brain problem occurs again, and the group is split into a group including node #1 and a group including node #3 and node #5. Since the group including node #3 and node #5 satisfies the quorum, it is determined as a major group, and the group including node #1 is changed to a minor group. On the other hand, since the time point of node #3 for joining the group is earliest, node #3 is elected as a new master node.

| ID | Joining time | Node state | Group state |
|---|---|---|---|
| Node #1 | ***_12:12:33 | Slave | Minor |
| Node #2 | ***_12:12:35 | Slave | Minor |
| Node #3 | ***_12:12:38 | Master | Major |
| Node #4 | ***_12:12:39 | Slave | Minor |
| Node #5 | ***_12:12:40 | Slave | Major |
| Node #6 | ***_12:12:42 | Slave | Minor |

Step (5): a network split-brain problem occurs again in the group consisting of two nodes (node #3 and node #5), and the group is then split into two groups. In the same manner as step (2), the group including node #3 of which the time point of joining the group is earliest among the nodes previously included in the major group is determined as a new major group.

It is possible to guarantee service continuity by utilizing a history table as described above even when a group is split into two groups having the same number of nodes or there are only the groups each of which includes only one node due to continuous errors.

Figure 6:
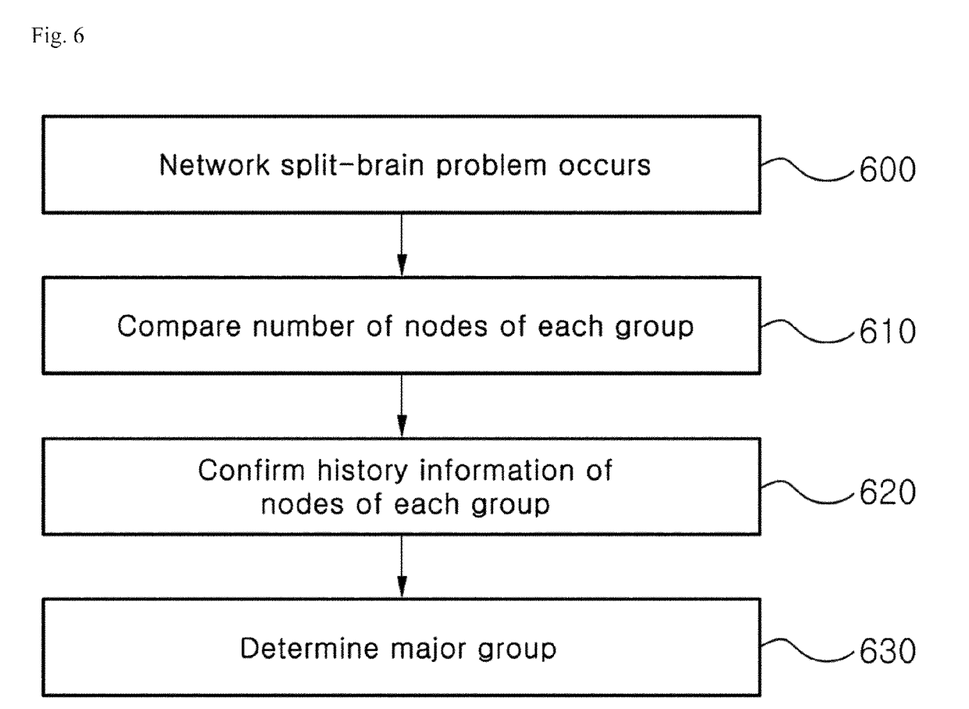
FIG. 6 is a view showing an example of a method for determining a major group when a network split-brain problem occurs according to an exemplary embodiment of the present invention.

FIG. 6 is a view showing an example of a method for determining a major group when a network split-brain problem occurs. When a network split-brain problem occurs (600) and a group is then split into two or more groups, the distributed environment management system 200 confirms and compares the number of total nodes included in the existing group and the number of nodes included in each of the split groups (610). In addition, the distributed environment management system 200 confirms history information of the nodes of each split group using the history table described above (620). Since specific examples of the history information have been described above in detail, they will not be described again, here. Although the step of confirming and comparing the number of nodes (610) is performed prior to the step of confirming the node history information (620) in the figure, the order of performing the two steps is not important. That is, it is possible to reverse the order of performing the two steps shown in the figure, or the two steps may be performed simultaneously. It is possible to determine a major group (630) among the two or more split groups using at least one of a result of comparing the number of nodes and the confirmed history information obtained from the two steps (610) and (620).

The aforementioned exemplary embodiments of the present invention can be implemented in the form of a program command that can be executed through a variety of constitutional components of a computer and recorded in a computer readable medium. The computer readable medium may store program commands, data files, data structures, and the like in an independent or combined form. The program command recorded in the computer readable medium may be a command specially designed and constructed for the present invention or a command publicized to and used by those skilled in a computer software field. The computer readable medium includes, for example, magnetic media such as a hard disk, a floppy disk and a magnetic tape, optical recording media such as CD-ROM and DVD, magneto-optical media such as a floptical disk, and a hardware device specially constructed to store and execute a program command, such as ROM, RAM, flash memory, and the like. The program command includes, for example, high-level language codes that can be executed by a computer using an interpreter or the like, as well as machine language codes created by a compiler. The hardware device may be constructed to operate as one or more software modules in order to perform the processing according to exemplary embodiments of the present invention. Likewise, the software modules may be implemented by one or more hardware devices in order to perform the processing according to exemplary embodiments of the present invention.

Although the present invention has been described above with reference to illustrated exemplary embodiments and specific matters such as constitutional components, these descriptions are provided only for the purpose of fully conveying an understanding of the present invention to those skilled in the art and it is not intended that the present invention be limited thereto. Rather, it will be apparent to those skilled in the art that various modifications and changes can be made in the present invention without departing from the spirit or scope of the invention. Thus, it is intended that the present invention cover the modifications and variations of this invention provided they come within the scope of the appended claims and their equivalents.

What is claimed is:

1. A method that uses a processor for determining a major group among at least two groups created by splitting an initial group comprising a plurality of nodes in a network-based distributed environment, the method comprising:
    comparing a number of nodes included in a first group with a number of nodes included in a second group, the first and second groups being among the at least two groups created by splitting the initial group;
    acquiring history information of the nodes included in the first group and the second group; and
    determining, using the processor, the first group or the second group as the major group using at least one of a result of comparing the number of nodes and the acquired history information,
    wherein the first group and the second group are created from the initial group being split at least twice, and the first group or the second group is determined as the major group only when a group which both of the first group and the second group recently belonged to was a major group, and
    wherein the acquired history information comprises information on time points when the nodes included in the first group and the second group joined the initial group.

2. The method of claim 1, wherein a group including a node that has an earliest time point of joining the initial group among the first group and the second group is determined as the major group.

3. The method of claim 1, wherein a group including a node that was a master node in the initial group among the first group and the second group is determined as the major group.

4. The method of claim 1, wherein the acquiring history information and determining a major group are both performed when a difference between the number of nodes included in the first group and the number of nodes included in the second group is not more than a reference value.

5. The method of claim 4, further comprising determining a group including more nodes among the first group and the second group as the major group when the difference exceeds the reference value.

6. The method of claim 1, wherein only the nodes belonging to the major group are allowed to read and write specific data.

7. The method of claim 6, wherein the specific data comprises lock information in the distributed environment.

8. The method of claim 1, wherein the acquired history information comprises information included in a history table that is replicated in each of the plurality of nodes.

9. The method of claim 8, wherein the history table comprises information on time points of the plurality of nodes for joining the initial group.

10. A non-transitory computer-readable recording medium comprising an executable program used to determine a major group among at least two groups created by splitting an initial group comprising a plurality of nodes in a network-based distributed environment, and when executed, the executable program causes performance of the following steps:
    comparing a number of nodes included in a first group with a number of nodes included in a second group, the first and second groups being among the at least two groups created by splitting the initial group;
    acquiring history information of the nodes included in the first group and the second group; and
    determining the first group or the second group as the major group using at least one of a result of comparing the number of nodes and the acquired history information,
    wherein the first group and the second group are created from the initial group being split at least twice, and the first group or the second group is determined as the major group only when a group which both of the first group and the second group recently belonged to was a major group, and
    wherein the acquired history information comprises information on time points when the nodes included in the first group and the second group joined the initial group.

11. A distributed environment management system comprising a plurality of nodes, comprising:
    a storage device; and
    a history information of the plurality of nodes stored on the storage device,
    wherein when an initial group of the nodes is split into at least two groups of the nodes at least one of the nodes is configured to determine one of the at least two groups as a major group using at least one of the number of nodes included in each split group and the history information,
    wherein a first group and a second group are created from the initial group being split at least twice, and the first group or the second group is determined as the major group only when a group which both of the first group and the second group recently belonged to was a major group, and
    wherein the history information comprises information on time points when the nodes joined the initial group.

12. The distributed environment management system of claim 11, wherein the history information further comprises information on a state of a group which the plurality of nodes respectively recently belonged to.

* * * * *